(12) United States Patent
Yu et al.

(10) Patent No.: US 11,640,210 B2
(45) Date of Patent: May 2, 2023

(54) TOUCH PANEL AND TOUCH DEVICE

(71) Applicant: TPK Advanced Solutions Inc., Fujian (CN)

(72) Inventors: Chien-Hsien Yu, Zhubei (TW); Zi-Jun Ding, Xiamen (CN); Yun-Guo Xu, Fuzhou (CN); Jian-Hua Fang, Putian (TW); Li-De Lv, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/105,697

(22) Filed: Nov. 27, 2020

(65) Prior Publication Data

US 2022/0171477 A1    Jun. 2, 2022

(51) Int. Cl.
    *G06F 3/041*    (2006.01)
(52) U.S. Cl.
    CPC .................... *G06F 3/041* (2013.01)
(58) Field of Classification Search
    CPC ........... G06F 3/041; G06F 2203/04103; G06F 3/04164
    See application file for complete search history.

(56) References Cited

U.S. PATENT DOCUMENTS

| 10,795,498 B1* | 10/2020 | Chang | G06F 3/04164 |
| 2015/0070312 A1* | 3/2015 | Her | G06F 3/0446 |
| | | | 345/174 |
| 2015/0109246 A1* | 4/2015 | Lee | G06F 3/044 |
| | | | 345/174 |
| 2015/0130760 A1* | 5/2015 | Kim | G06F 3/0445 |
| | | | 345/174 |
| 2015/0301685 A1* | 10/2015 | Kim | G06F 3/0418 |
| | | | 345/173 |
| 2016/0139719 A1* | 5/2016 | Liu | G06F 3/0443 |
| | | | 345/174 |
| 2016/0224165 A1* | 8/2016 | Koo | G06F 3/0443 |
| 2016/0274689 A1* | 9/2016 | Lin | G06F 3/041 |
| 2016/0370892 A1* | 12/2016 | Chang | G06F 3/04164 |
| 2017/0346041 A1* | 11/2017 | Kim | H01L 51/5256 |
| 2018/0196564 A1* | 7/2018 | Lin | H01L 51/5253 |
| 2018/0198089 A1* | 7/2018 | Kim | H01L 51/5284 |
| 2018/0217703 A1* | 8/2018 | Koike | G06F 3/0443 |

FOREIGN PATENT DOCUMENTS

| JP | H10303252 A | 11/1998 |
| KR | 20150073254 A | 7/2015 |
| KR | 20200113174 A | 10/2020 |

* cited by examiner

*Primary Examiner* — Temesghen Ghebretinsae
*Assistant Examiner* — Sosina Abebe
(74) *Attorney, Agent, or Firm* — Cooper Legal Group, LLC

(57) ABSTRACT

A touch panel includes a substrate, a raised structure, a touch sensing electrode layer, and a peripheral circuit layer. The substrate has a visible region and a border region surrounding the visible region. The raised structure is disposed on the substrate and located in the border region, in which the raised structure and the substrate constitute a step area. The touch sensing electrode layer is disposed in the visible region and partially extends to the border region to cross over the raised structure and cover the step area. The peripheral circuit layer is disposed in the border region, and overlaps the touch sensing electrode layer at least on the raised structure and the step area.

20 Claims, 3 Drawing Sheets

TOUCH PANEL AND TOUCH DEVICE

BACKGROUND

Field of Disclosure

The present disclosure relates to a touch panel and a touch device, and particularly relates to a touch panel and a touch device having an overlapping structure.

Description of Related Art

In recent years, touch panels have been widely used in portable electronic products such as mobile phones, notebook computers, satellite navigation systems, and digital audio-visual players to serve as information communication channels between users and electronic devices.

A touch panel includes touch electrodes and peripheral circuits, and the touch electrodes and the peripheral circuits are usually in contact with each other in the peripheral area to form a conductive path or loop, in which the contact impedance will affect the signal transmission and the response rate of the touch panel. The contact impedance depends on an overlapping area between the touch electrodes and the peripheral circuits. Generally, the contact impedance becomes lower when the overlapping area becomes larger. However, the overlapping area will directly affect the size of the peripheral area of the touch panel, and as demands for narrow bezel products gradually increase, a touch panel which can not only meet the size requirements of the peripheral area, but also meet the requirements of the contact impedance is currently worth studying.

SUMMARY

According to some embodiments of the present disclosure, a touch panel includes a substrate, a raised structure, a touch sensing electrode layer, and a peripheral circuit layer. The substrate has a visible region and a border region surrounding the visible region. The raised structure is disposed on the substrate and located in the border region, in which the raised structure and the substrate constitute a step area. The touch sensing electrode layer is disposed in the visible region and partially extends to the border region to cross over the raised structure and cover the step area. The peripheral circuit layer is disposed in the border region and overlaps the touch sensing electrode layer at least on the raised structure and the step area.

In some embodiments, the touch sensing electrode layer includes a matrix and a plurality of metal nanostructures distributed in the matrix.

In some embodiments, the raised structure includes a metal material, and a reactivity of the metal material is higher than a reactivity of the metal nanostructures.

In some embodiments, the raised structure has a central area and a peripheral area surrounding the central area, and a vertical thickness of the central area is greater than a vertical thickness of the peripheral area.

In some embodiments, the touch sensing electrode layer has a first portion and a second portion, the first portion covers the central area of the raised structure, the second portion covers the peripheral area of the raised structure and the step area, and the first portion is connected to the second portion.

In some embodiments, the second portion of the touch sensing electrode layer is in contact with the substrate at the step area.

In some embodiments, the touch sensing electrode layer includes a plurality of metal nanostructures, and a density of the metal nanostructures in the second portion of the touch sensing electrode layer is greater than a density of the metal nanostructures in the first portion of the touch sensing electrode layer.

In some embodiments, the density of the metal nanostructures in the first portion of the touch sensing electrode layer is between 10% and 50%, and the density of the metal nanostructures in the second portion of the touch sensing electrode layer is greater than the density of the metal nanostructures in the first portion of the touch sensing electrode layer by 7% to 18%.

In some embodiments, a maximum vertical thickness of the raised structure is between 2 μm and 8 μm.

In some embodiments, the substrate is a protective cover, and the raised structure is at least a portion of a light shielding structure.

In some embodiments, the touch sensing electrode layer conformally extends on the raised structure.

In some embodiments, the touch sensing electrode layer overlaps the peripheral circuit layer to define an overlapping area.

According to some other embodiments of the present disclosure, a touch device includes the aforementioned touch panel.

In some embodiments of the present disclosure, the touch device includes a display, a portable phone, a notebook, a tablet, a wearable device, a wearable device, a car device, or a polarizer.

According to the aforementioned embodiments of the present disclosure, since the touch panel of the present disclosure has a raised structure disposed between the substrate and the touch sensing electrode layer, the overlapping area between the touch sensing electrode layer and the peripheral circuit layer can be increased, such that the contact impedance between the touch sensing electrode layer and the peripheral circuit layer can be decreased. Accordingly, the electrical overlapping stability between the touch sensing electrode layer and the peripheral circuit layer can be improved, such that a lateral space required for the overlapping can be reduced. As a result, a lateral width of the border region of the touch panel can be reduced to meet the needs of users for narrow bezel products.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
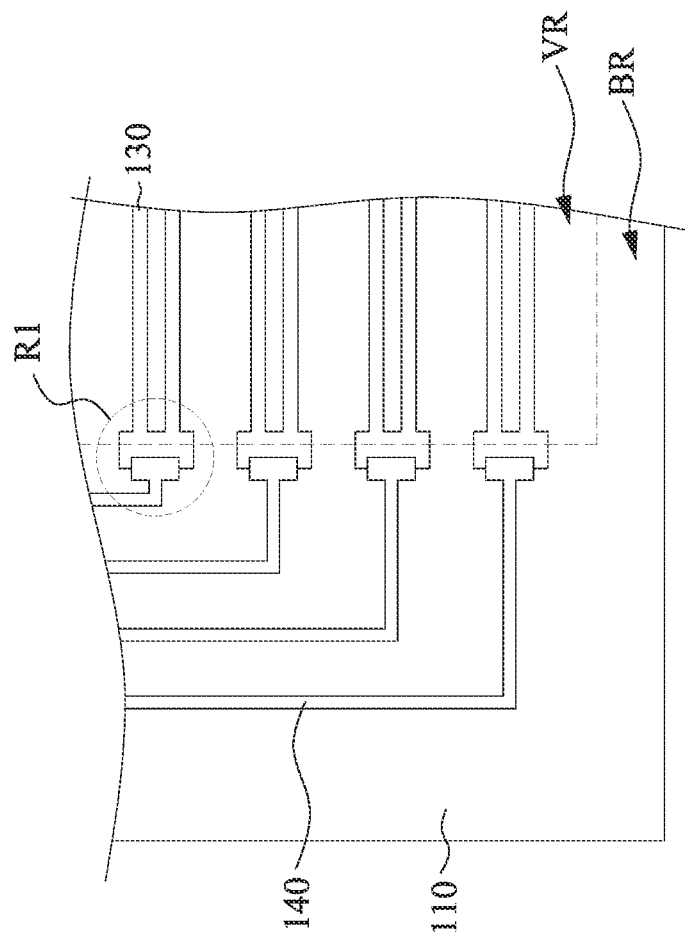
FIG. 1 is a schematic top view illustrating a touch panel according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides a touch panel, which has a raised structure disposed between a substrate and a touch sensing electrode layer. Through the configuration of the raised structure, the electrical overlapping stability between the touch sensing electrode layer and the peripheral circuit layer can be improved, and a lateral width of the border region of the touch panel can be reduced to meet the needs of users for narrow bezel products.

Figure 2:
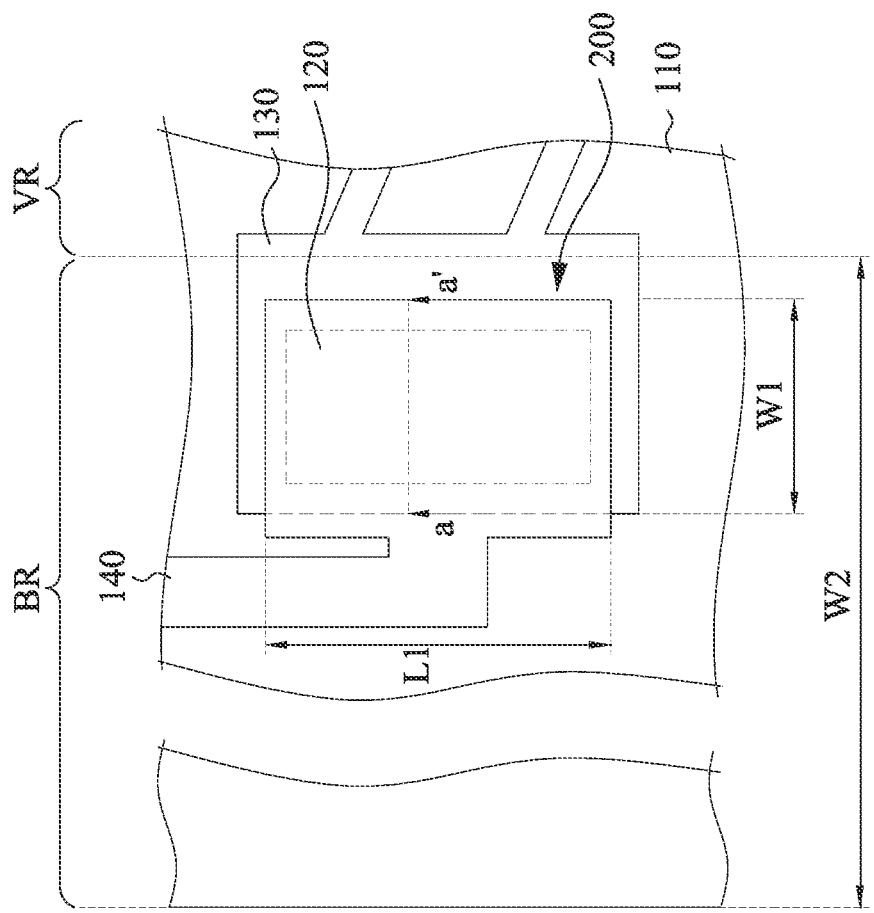
FIG. 2 is a schematic partial enlargement view illustrating the region R1 of the touch panel in FIG. 1.
Figure 3:
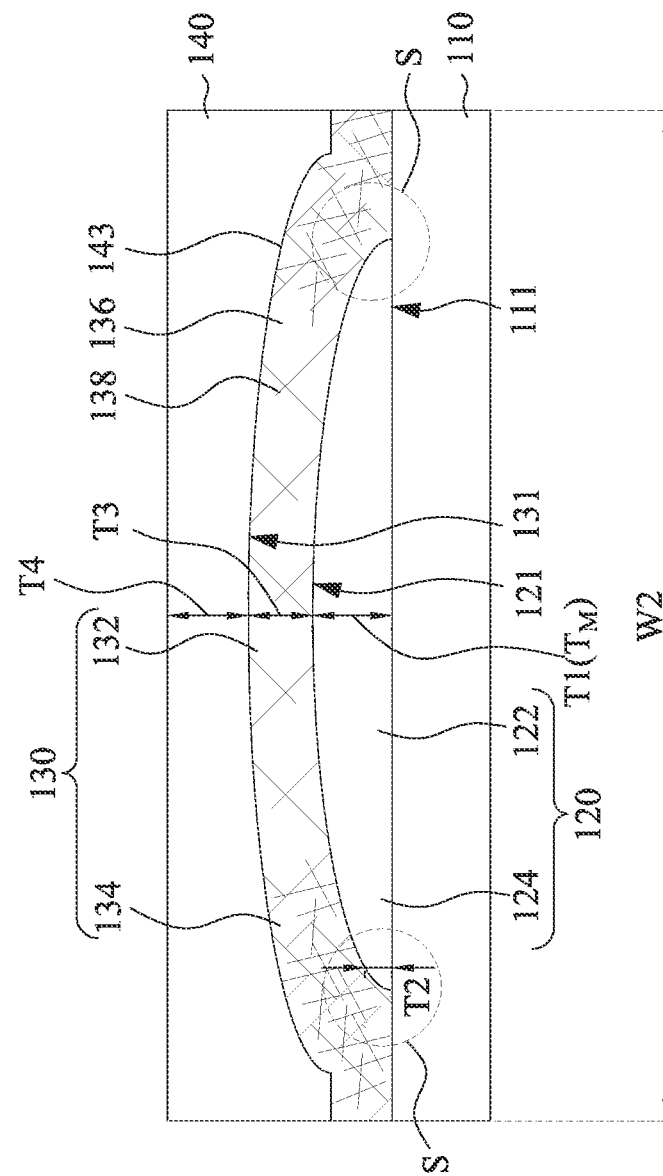
FIG. 3 is a schematic cross-sectional view illustrating the touch panel in FIG. 2 taken along line a-a' according to some embodiments of the present disclosure.
Figure 3:
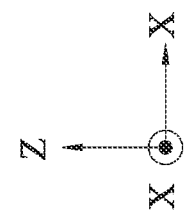

FIG. 1 is a schematic top view illustrating a touch panel 100 according to some embodiments of the present disclosure. FIG. 2 is a schematic partial enlargement view illustrating the region R1 of the touch panel 100 in FIG. 1. FIG. 3 is a schematic cross-sectional view illustrating the touch panel 100 in FIG. 2 taken along line a-a' according to some embodiments of the present disclosure. Reference is made to FIG. 1 to FIG. 3. The touch panel 100 includes a substrate 110, a raised structure 120, a touch sensing electrode layer 130, and a peripheral circuit layer 140. The substrate 110 extends along a horizontal plane (e.g., a plane formed by the X axis and the Y axis) and has a visible region VR and a border region BR surrounding the visible region VR. Although the touch sensing electrode layer 130 in this embodiment is illustrated to include X-axis electrodes, the touch sensing electrode layer 130 may also include Y-axis electrodes in actual designs. In addition, the electrode pattern of the touch sensing electrode layer 130 is not limited to the present disclosure.

In some embodiments, the substrate 110 may be, for example, a rigid transparent substrate or a flexible transparent substrate. In some embodiments, a material of the substrate 110 includes, but is not limited to, transparent materials such as glass, acrylic, polyvinyl chloride, polypropylene, polystyrene, polycarbonate, cycloolefin polymer, cycloolefin copolymer, polyethylene terephthalate, polyethylene naphthalate, colorless polyimide, or combinations thereof. In some embodiments, pre-treatment steps may be performed on the surface of the substrate 110. For example, a surface modification process is performed or an adhesive layer or a resin layer is additionally coated on the surface of the substrate 110 to enhance the adhesion between the substrate 110 and other layers (e.g., the raised structure 120 and/or the touch sensing electrode layer 130 over the substrate 110).

In some embodiments, the raised structure 120 is disposed on the substrate 110 and located in the border region BR. The raised structure 120 is raised vertically (e.g., along the Z-axis), and a height difference exists between the raised structure 120 and the substrate 110. Such a height difference can constitute a step area S. The touch sensing electrode layer 130 is disposed on the substrate 110 and located in the visible region VR, and partially extends to the border region BR so as to cross over the raised structure 120 and cover the step area S. The peripheral circuit layer 140 is disposed on the substrate 110 and located in the border region BR, and overlaps the touch sensing electrode layer 130 at least on the raised structure 120 and the step area S. In some embodiments, the raised structure 120, the touch sensing electrode layer 130, and the peripheral circuit layer 140 are sequentially stacked on the substrate 110 to form an overlapping structure 200 located in the border region BR.

In some embodiments, the touch sensing electrode layer 130 overlaps the peripheral circuit layer 140 to define an overlapping region, and the overlapping region has an overlapping area. In this embodiment, the overlapping region is a quadrilateral region in a top view (i.e., the viewing angle of FIG. 2). More specifically, the overlapping region in this embodiment is a quadrilateral region formed by a length L1 and a width W1 in a top view.

When the touch panel 100 is in operation, the touch sensing electrode layer 130 located in the visible region VR can sense touch motion of a user to generate a touch sensing signal, and the touch sensing signal can further be transmitted to the peripheral circuit layer 140 located in the border region BR for subsequent signal processing through the overlapping contact between the touch sensing electrode layer 130 and the peripheral circuit layer 140 in the overlapping structure 200. In the following descriptions, the overlapping structure 200 of the present disclosure will be described in more detail.

It should be understood that the cross-section taken along line a-a' in FIG. 3 is the cross-section of the overlapping structure 200 of the present disclosure. That is, FIG. 3 is a schematic cross-sectional view illustrating the overlapping structure 200 of the touch panel 100 in FIG. 2. Reference is made to FIG. 3. In some embodiments, the raised structure 120 has a central area 122 and a peripheral area 124 surrounding the central area 122, and a thickness T1 of the central area 122 along the Z axis (also referred to as a vertical thickness T1) is greater than a thickness T2 of the peripheral area 124 along the Z axis (also referred to as a vertical thickness T2). For example, a thickness of the raised structure 120 gradually decreases from the central area 122 to the peripheral area 124, and a degree of the thickness reduction gradually increases from the central area 122 to the peripheral area 124. Such a change in thickness can make an upper surface of the raised structure 120 be formed as a convex curved surface. In some embodiments, a maximum vertical thickness $T_M$ of the raised structure 120 may be between 2 μm and 8 μm, so as to improve the electrical overlapping stability between the touch sensing electrode layer 130 and the peripheral circuit layer 140, thereby reducing a lateral width W2 of the border region BR of the touch panel 100 (which will be described in detail below). In some embodiments, a top surface 121 of the raised structure 120 may be, for example, a smooth curved surface (as shown in FIG. 3). In some other embodiments, the top surface 121 of the raised structure 120 may be, for example, a regular/irregular surface, such as having a stepped shape or a wave shape. It should be understood that as long as the vertical thickness T1 of the central area 122 of the raised structure 120 is greater than the vertical thickness T2 of the peripheral area 124 of the raised structure 120, any contour of the top surface 121 falls within the scope of the present disclosure. In some embodiments, when the substrate 110 serves as a protective cover of the touch panel 100, the raised structure 120 may be at least a portion of a light shielding structure of the touch panel 100 and is made of, for example, a dark or opaque photoresist material.

In some embodiments, the touch sensing electrode layer 130 laterally crosses over the entire raised structure 120 along the X-axis. In other words, in the overlapping structure 200, a vertical projection of the touch sensing electrode layer 130 on the substrate 110 may, for example, completely cover a vertical projection of the raised structure 120 on the substrate 110. Specifically, in the overlapping structure 200, the touch sensing electrode layer 130 has a first portion 132 and a second portion 134 laterally surrounding the first portion 132, in which the first portion 132 covers the central area 122 of the raised structure 120, and the second portion 134 covers the peripheral area 124 of the raised structure 120 and the step area S. The first portion 132 is connected to the second portion 134, and the highest position (e.g., the top surface) of the first portion 132 is higher than the highest position of the second portion 134. In addition, the second portion 134 of the touch sensing electrode layer 130 is in contact with the substrate 110 at the step area S.

In some embodiments, the touch sensing electrode layer 130 located on the raised structure 120 may fluctuate with the contour of the top surface 121 of the raised structure 120. In other words, in the overlapping structure 200, the contour of the touch sensing electrode layer 130 may depend on the contour of the top surface 121 of the raised structure 120. In some embodiments, the touch sensing electrode layer 130 may conformally extend on the raised structure 120 and the substrate 110. That is, in the overlapping structure 200, the touch sensing electrode layer 130 may have a uniform and consistent thickness T3 relative to the top surface 121 of the raised structure 120, and the touch sensing electrode layer 130 in contact with the substrate 110 may also have a uniform and consistent thickness T3 relative to the top surface 111 of the substrate 110. In some embodiments, the thickness T3 of the touch sensing electrode layer 130 may be between 30 nm and 120 nm, such that the required electrical overlapping stability between the touch sensing electrode layer 130 and the peripheral circuit layer 140 can be maintained, and bad influences on the optical property of the touch panel 100 can be prevented. In detail, when the thickness T3 of the touch sensing electrode layer 130 is less than 30 nm, the signal transmission may be affected due to excessively high surface resistance; when the thickness T3 of the touch sensing electrode layer 130 is greater than 120 nm, the optical property of the touch panel 100 may be affected.

In some embodiments, the touch sensing electrode layer 130 may include a matrix 136 and a plurality of metal nanowires (also referred to as metal nanostructures) 138 distributed in the matrix 136. In some embodiments, the matrix 136 may include polymers or a mixture thereof, thereby giving specific chemical, mechanical, and optical properties to the touch sensing electrode layer 130. For example, the matrix 136 can provide good adhesion between the touch sensing electrode layer 130 and the raised structure 120 and between the touch sensing electrode layer 130 and the substrate 110. As another example, the matrix 136 can provide the touch sensing electrode layer 130 with good mechanical strength. In some embodiments, the matrix 136 includes a specific polymer, such that the touch sensing electrode layer 130 has additional surface protection against scratches and abrasion, thereby enhancing the surface strength of the touch sensing electrode layer 130. The above specific polymer may be, for example, polyacrylate, epoxy resin, polyurethane, poly (silicon-acrylic acid), polysiloxane, polysilane, or combinations thereof. In some embodiments, the matrix 136 may further include crosslinking agents, polymerization inhibitors, stabilizers (e.g., including but not limited to antioxidants or ultraviolet light stabilizers), surfactants, or combinations thereof, thereby improving the anti-ultraviolet property of the touch sensing electrode layer 130 and prolonging the service life of the touch sensing electrode layer 130.

The metal nanowires 138 may include, but are not limited to, silver nanowires, gold nanowires, copper nanowires, nickel nanowires, or combinations thereof. More specifically, the term "metal nanowires 138" used herein is a collective noun, which refers to a collection of metal wires that include multiple metal elements, metal alloys, or metal compounds (including metal oxides). In some embodiments, a cross-sectional size (e.g., a diameter of the cross-section) of a single metal nanowire may be less than 500 nm, preferably less than 100 nm, and more preferably less than 50 nm. In some embodiments, a single metal nanowire 138 has a large aspect ratio (i.e., length: diameter of the cross-section). Specifically, the aspect ratio of a single metal nanowire may be between 10 and 100,000. In more detail, the aspect ratio of a single metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

In some embodiments, the peripheral circuit layer 140 on the raised structure 120 laterally crosses over the touch sensing electrode layer 130 along the X-axis. In other words, in the overlapping structure 200, the peripheral circuit layer 140 may be located directly above the touch sensing electrode layer 130 and cover the touch sensing electrode layer 130, so as to electrically connect to the touch sensing electrode layer 130. Through the electrical overlapping between the touch sensing electrode layer 130 and the peripheral circuit layer 140, touch sensing signals can be transmitted in the touch panel 100 without hindrance. In some embodiments, a bottom surface 143 of the peripheral circuit layer 140 may fluctuate with the contour of a top surface 131 of the touch sensing electrode layer 130. That is, the contour of the bottom surface 143 of the peripheral circuit layer 140 may depend on the contour of the top surface 131 of the touch sensing electrode layer 130. In some embodiments, the peripheral circuit layer 140 may have a vertical thickness T4 that varies with position. In detail, the vertical thickness T4 of the peripheral circuit layer 140 may gradually increase laterally from a center to a periphery of the overlapping structure 200. In some other embodiments, the region of the peripheral circuit layer 140 corresponding to the raised structure 120 may also have a uniform and consistent thickness T4 relative to the top surface 131 of the touch sensing electrode layer 130. In some embodiments, the peripheral circuit layer 140 may include, for example, copper, silver, copper-silver alloy, or other suitable conductive materials.

In some embodiments, the electrical overlapping stability between the touch sensing electrode layer 130 and the peripheral circuit layer 140 may depend on the physical characteristics of the raised structure 120 (e.g., the shape, the vertical thickness of the raised structure 120, etc.). In other words, by adjusting the physical characteristics of the raised structure 120, the electrical overlapping stability between the touch sensing electrode layer 130 and the peripheral circuit layer 140 can be improved. Specifically, when the touch sensing electrode layer 130 is disposed on the raised structure 120, since the raised structure 120 has a middle convex structure, the touch sensing electrode layer 130 can be formed in a shape similar to an "arch bridge". Accordingly, the actual overlapping area can be increased under the premise that the size of the overlapping area (e.g., the length L1 and the width W1 of the overlap area) formed between the touch sensing electrode layer 130 and the peripheral circuit layer 140 remains unchanged. Furthermore, the metal nanowires 138 in the touch sensing electrode layer 130 can settle to gather at the step area S due to gravity. As a result, the contact impedance between the touch sensing electrode layer 130 (especially the second portion 134 of the touch sensing electrode layer 130) and the peripheral circuit layer 140 can be reduced, thereby improving the electrical overlapping stability between the touch sensing electrode layer 130 and the peripheral circuit layer 140.

As mentioned above, since the maximum vertical thickness $T_M$ of the raised structure 120 may be between 2 μm and 8 μm, the electrical overlapping stability between the touch sensing electrode layer 130 and the peripheral circuit layer 140 can be improved, such that the lateral width W2 of the border region BR of the touch panel 100 is reduced. In detail, when the touch sensing electrode layer 130 is disposed on the raised structure 120, if the maximum vertical thickness $T_M$ of the raised structure 120 is less than 2 μm, the touch sensing electrode layer 130 may not be able to form a shape similar to an "arch bridge". As such, the touch sensing electrode layer 130 may be disposed on the substrate 110 in a manner approximal to a plane, such that the overlapping area between the touch sensing electrode layer 130 and the peripheral circuit layer 140 cannot be effectively increased, and the metal nanowires 138 cannot settle and gather at the step area S by a proper amount. As a result, the contact impedance between the touch sensing electrode layer 130 and the peripheral circuit layer 140 cannot meet the design requirements, and only an overlapping region of a larger size can be designed to increase the overlapping area, such that the lateral width W2 of the border region BR of the touch panel 100 cannot be reduced. On the other hand, when the touch sensing electrode layer 130 is disposed on the raised structure 120, if the maximum vertical thickness $T_M$ of the raised structure 120 is greater than 8 μm, the metal nanowires 138 in the touch sensing electrode layer 130 may excessively settle and gather, such that electrical overlapping between the first portion 132 of the touch sensing electrode layer 130 and the peripheral circuit layers 140 is unstable, and the touch sensing electrode layer 130 needs to climb to a higher height, thereby leading to electrical failure.

Since the metal nanowires 138 in the touch sensing electrode layer 130 are subjected to the physical characteristics of the raised structure 120 to settle and gather in the second portion 134 of the touch sensing electrode layer 130, a density of the metal nanowires 138 in the second portion 134 of the touch sensing electrode layer 130 is greater than a density of the metal nanowires 138 in the first portion 132 of the touch sensing electrode layer 130. It should be understood that the term "density" herein refers to the number of metal nanowires 138 included in the touch sensing electrode layer 130 per unit area. In some embodiments, the density of the metal nanowires 138 in the first portion 132 of the touch sensing electrode layer 130 may be between 10% and 50%, and preferably between 12% and 22% to satisfy optical and electrical properties, and the density of the metal nanowires 138 in the second portion 134 of the touch sensing electrode layer 130 may be greater than the density of the metal nanowires 138 in the first portion 132 of the touch sensing electrode layer 130 by about 7% to 18%. As such, the touch sensing electrode layer 130 can be ensured to have good conductivity, such that the touch sensing electrode layer 130 and the peripheral circuit layer 140 have good electrical overlapping stability. In detail, the aforementioned density will affect the surface resistance of the touch sensing electrode layer 130 and the overall optical appearance of the touch panel 100. If the density is too low, that is, the metal nanowires 138 are sparsely distributed in the matrix 136, excessive surface resistance may result; if the density is too high, that is, the metal nanowires 138 are densely distributed in the matrix 136, the light transmittance may be reduced and affect the optical property. It should be understood that the aforementioned optical property refers to the optical property of the visible region VR, and since the touch sensing electrode layer 130 located in the visible region VR and the touch sensing electrode layer 130 extending into the border region BR are formed as a whole on the entire surface by coating during the manufacturing process of the touch panel 100, the density of the metal nanowires 138 in the touch sensing electrode layer 130 located in the border region BR (especially the density of the metal nanowires 138 in the first portion 132 of the touch sensing electrode layer 130) is substantially similar to the density of the metal nanowires 138 in the touch sensing electrode layer 130 located in the visible area VR. Therefore, under the aforementioned design of coating the touch sensing electrode layer 130 as a whole on the entire surface, when considering the density of the metal nanowires 138 in the touch sensing electrode layer 130 located in the border region BR, it is also necessary to consider the optical property of the visible region VR of the touch panel 100. On the other hand, a metal material (e.g., copper) having a higher conductivity than the metal nanowires 138 can be selected to form the raised structure 120, such that the entire overlapping structure 200 can improve the electrical overlapping stability due to the raised structure 120 having the metal material.

In some embodiments, the electrical overlapping stability between the touch sensing electrode layer 130 and the peripheral circuit layer 140 may further depend on the chemical characteristics (e.g., the material) of the raised structure 120. In other words, by adjusting the chemical characteristics of the raised structure 120, the electrical overlapping stability between the touch sensing electrode layer 130 and the peripheral circuit layer 140 can be further improved. More specifically, a metal material having a higher reactivity (or chemical reactivity) than a reactivity of the metal nanowires 138 can be selected to form the raised structure 120, such that the metal nanowires 138 can gather in the touch sensing electrode layer 130 between the peripheral circuit layer 140 and the raised structure 120 more easily. Accordingly, the density of the metal nanowires 138 in the touch sensing electrode layer 130 of the overlapping structure 200 is increased to improve the electrical overlapping stability between the touch sensing electrode layer 130 and the peripheral circuit layer 140. For example, when silver nanowires are selected for use as the metal nanowires 138, a metal having a higher reactivity than a reactivity of silver (e.g., copper) can be selected as the material of the raised structure 120.

In more detail, the touch sensing electrode layer 130 can be formed through the steps of coating, curing, and drying of a dispersion including the metal nanowires 138. In some embodiments, the dispersion includes a solvent, such that the metal nanowires 138 are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires 138 and the solvent and the stability of the metal nanowires 138 in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof.

Firstly, the coating step may include, but is not limited to, screen printing, nozzle coating, or roller coating. In some embodiments, a roll-to-roll process may be performed to uniformly coat the dispersion including the metal nanowires 138 on the top surface 111 of the substrate 110 and the top surface 121 of the raised structure 120. Since the raised structure 120 has a middle convex structure, and the metal nanowires 138 in the dispersion which has not yet been dried will settle due to gravity and partially gather in the dispersion near the step area S. At the same time, if the reactivity of the material of the raised structure 120 is higher than the reactivity of the metal nanowires 138, the metal nanowires 138 in the dispersion will also be affected by the material of the raised structure 120 and gather at a position relatively close to the surface of the raised structure 120. In other words, the metal nanowires 138 in the dispersion coated on the periphery of the overlapping structure 200 (e.g., on the visible area VR shown in FIG. 2) will slightly move and partially gather in the position being in contact with the surface of the overlapping structure 200. Then, the curing and drying steps are performed, such that the metal nanowires 138 can be fixed onto the top surface 111 of the substrate 110 and the top surface 121 of the raised structure 120 to form the touch sensing electrode layer 130.

Overall, since in the aforementioned coating step, the metal nanowires 138 in the dispersion are affected by the physical characteristics (e.g., the vertical thickness, the shape, the conductivity, etc.) and chemical characteristics (e.g., the material) of the raised structure 120 to move and gather at specific positions, after the curing and drying steps are performed, the metal nanowires 138 can be densely distributed in the touch sensing electrode layer 130 located in the overlapping structure 200, and particularly in the second portion 134 of the touch sensing electrode layer 130 correspondingly in the step area S. Accordingly, the contact impedance between the touch sensing electrode layer 130 (especially the second portion 134 of the touch sensing electrode layer 130) and the peripheral circuit layer 140 can be reduced, thereby improving the electrical overlapping stability between the touch sensing electrode layer 130 and the peripheral circuit layer 140.

In some embodiments, a primary coating layer may be coated onto the metal nanowires 138, which are fixed onto the substrate 110 and the raised structure 120. The primary coating layer and the metal nanowires 138 are then formed into a composite structure layer by curing. In other words, the cured primary coating layer serves as the matrix 136 of the present disclosure, and the composite structure layer serves as the touch sensing electrode layer 130 of the present disclosure. In detail, the aforementioned polymer or the mixture thereof may be formed on the metal nanowires 138 by coating, the polymer or the mixture thereof may then infiltrate between the metal nanowires 138 to form a filler, and the filler is then cured to form the matrix 136. As such, the metal nanowires 138 can be embedded in the matrix 136. In some embodiments, the primary coating layer having the aforementioned polymer or the mixture thereof can be formed into the matrix 136 by heating and baking. In some embodiments, the temperature of heating and baking may be between 60° C. and 150° C. It should be understood that the physical structure between the matrix 136 and the metal nanowires 138 is not intended to limit the present disclosure. In some embodiments, the matrix 136 and the metal nanowires 138 may be a stack of two layers. In some other embodiments, the matrix 136 and the metal nanowires 138 may be mixed with each other to form a composite structure layer. In some preferred embodiments, the metal nanowires 138 are embedded in the matrix 136 to form the composite structure layer.

The touch panel 100 of the present disclosure can be assembled with other electronic devices, such as a display with touch function. For example, the touch panel 100 can be bonded to a display device (e.g., a liquid crystal display device or an organic light-emitting diode display device), and optical adhesive or other adhesives can be used to bond between the touch panel 100 and the display device. The touch panel 100 of the present disclosure can further be applied to electronic devices such as portable phones, tablets, and notebooks, and can also be applied to flexible products. The touch panel 100 of the present disclosure can also be applied to a polarizer. The touch panel 100 of the present disclosure can be applied to wearable devices (e.g., watches, glasses, smart clothes, and smart shoes) and automotive devices (e.g., dashboards, driving recorders, rear-view mirrors, and windows).

Since the touch panel of the present disclosure has a raised structure disposed between the substrate and the touch sensing electrode layer, the overlapping area between the touch sensing electrode layer and the peripheral circuit layer can be increased, such that the contact impedance between the touch sensing electrode layer and the peripheral circuit layer can be decreased. Accordingly, the electrical overlapping stability between the touch sensing electrode layer and the peripheral circuit layer can be improved, such that a lateral space required for the overlapping can be reduced. As a result, a lateral width of the border region of the touch panel can be reduced to meet the needs of users for narrow bezel products.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch panel, comprising:
   a substrate having a visible region and a border region surrounding the visible region;
   a raised structure disposed on the substrate and located in the border region, wherein:
   the raised structure and the substrate constitute a step area,
   the raised structure has a central area located in the border region and a peripheral area located in the border region,
   the peripheral area is disposed on at least two opposite sides of the central area, and
   a vertical thickness of the central area is greater than a vertical thickness of the peripheral area at both of the at least two opposite sides of the central area;
   a touch sensing electrode layer disposed in the visible region and partially extending to the border region to cross over the raised structure and cover the step area such that the raised structure is between the touch sensing electrode and the substrate, wherein the touch sensing electrode layer comprises a matrix and a plurality of metal nanostructures distributed in the matrix; and a peripheral circuit layer disposed in the border region, wherein a portion of the peripheral circuit layer is disposed on the touch sensing electrode layer and contacts the touch sensing electrode layer at least on the raised structure and the step area.

2. The touch panel of claim 1, wherein the raised structure comprises a metal material, and a reactivity of the metal material is higher than a reactivity of the metal nanostructures.

3. The touch panel of claim 1, wherein the touch sensing electrode layer has a first portion and a second portion, the first portion covers the central area of the raised structure, the second portion covers the peripheral area of the raised structure and the step area, and the first portion is connected to the second portion.

4. The touch panel of claim 3, wherein the second portion of the touch sensing electrode layer is in contact with the substrate at the step area.

5. The touch panel of claim 3, wherein the touch sensing electrode layer comprises a plurality of metal nanostructures, and a density of the metal nanostructures in the second portion of the touch sensing electrode layer is greater than a density of the metal nanostructures in the first portion of the touch sensing electrode layer.

6. The touch panel of claim 5, wherein the density of the metal nanostructures in the first portion of the touch sensing electrode layer is between 10% and 50%, and the density of the metal nanostructures in the second portion of the touch sensing electrode layer is greater than the density of the metal nanostructures in the first portion of the touch sensing electrode layer by 7% to 18%.

7. The touch panel of claim 1, wherein a maximum vertical thickness of the raised structure is between 2 µm and 8 µm.

8. The touch panel of claim 1, wherein the substrate is a protective cover, and the raised structure is at least a portion of a light shielding structure.

9. The touch panel of claim 1, wherein the touch sensing electrode layer conformally extends on the raised structure.

10. The touch panel of claim 1, wherein the touch sensing electrode layer overlaps the peripheral circuit layer to define an overlapping area.

11. A touch device comprising the touch panel of claim 1.

12. The touch device of claim 11, wherein the touch device comprises a display, a portable phone, a notebook, a tablet, a wearable device, a car device, or a polarizer.

13. The touch panel of claim 10, wherein a length of the overlapping area is greater than a length of the raised structure and a width of the overlapping area is greater than a width of the raised structure.

14. A touch panel, comprising:
a substrate having a visible region and a border region surrounding the visible region;
a raised structure disposed on the substrate and located in the border region, wherein:
the raised structure and the substrate constitute a step area, and
the raised structure has a curved top surface;
a touch sensing electrode layer disposed in the visible region and partially extending to the border region to cross over the raised structure and cover the step area such that the raised structure is between the touch sensing electrode and the substrate, wherein the touch sensing electrode layer comprises a matrix and a plurality of metal nanostructures distributed in the matrix; and
a peripheral circuit layer disposed in the border region, wherein a portion of the peripheral circuit layer is disposed on the touch sensing electrode layer and contacts the touch sensing electrode layer at least on the raised structure and the step area.

15. The touch panel of claim 14, wherein:
the raised structure has a central area located in the border region and a peripheral area located in the border region,
the peripheral area is disposed on at least two opposite sides of the central area, and
a vertical thickness of the central area is greater than a vertical thickness of the peripheral area at both of the at least two opposite sides of the central area.

16. The touch panel of claim 14, wherein the peripheral circuit layer covers an entirety of the raised structure.

17. The touch panel of claim 14, wherein a density of the metal nanostructures changes over the raised structure.

18. A touch panel, comprising:
a substrate having a visible region and a border region surrounding the visible region;
a raised structure disposed on the substrate and located in the border region, wherein the raised structure and the substrate constitute a step area;
a touch sensing electrode layer disposed in the visible region and partially extending to the border region to cross over the raised structure and cover the step area such that the raised structure is between the touch sensing electrode and the substrate, wherein the touch sensing electrode layer comprises a matrix and a plurality of metal nanostructures distributed in the matrix; and
a peripheral circuit layer disposed in the border region, wherein a portion of the peripheral circuit layer is disposed on the touch sensing electrode layer and contacts the touch sensing electrode layer at least on the raised structure and the step area, wherein the peripheral circuit layer covers an entirety of the raised structure.

19. The touch panel of claim 18, wherein:
the raised structure has a central area located in the border region and a peripheral area located in the border region,
the peripheral area is disposed on at least two opposite sides of the central area, and
a vertical thickness of the central area is greater than a vertical thickness of the peripheral area at both of the at least two opposite sides of the central area.

20. The touch panel of claim 19, wherein a density of the metal nanostructures overlying the central area of the raised structure is less than the density of the metal nanostructures in the peripheral area of the raised structure.

* * * * *